US012578683B2

(12) United States Patent
Monferrer et al.

(10) Patent No.: US 12,578,683 B2
(45) Date of Patent: Mar. 17, 2026

(54) MECHANISM FOR DISPLAYING PERIODS OF AN ANNUAL CYCLE OF A TIMEPIECE

(71) Applicant: Blancpain SA, Le Brassus (CH)

(72) Inventors: Bernat Monferrer, St-Prex (CH); Guillaume Boscaroli, Le Solliat (CH)

(73) Assignee: BLANCPAIN SA, Le Brassus (CH)

( * ) Notice: Subject to any disclaimer, the term of this patent is extended or adjusted under 35 U.S.C. 154(b) by 256 days.

(21) Appl. No.: 18/475,787

(22) Filed: Sep. 27, 2023

(65) Prior Publication Data

US 2024/0168440 A1 May 23, 2024

(30) Foreign Application Priority Data

Nov. 17, 2022 (EP) .................................... 22207987

(51) Int. Cl.
*G04B 19/24* (2006.01)
*G04B 19/02* (2006.01)

(52) U.S. Cl.
CPC ............. *G04B 19/24* (2013.01); *G04B 19/02* (2013.01)

(58) Field of Classification Search
CPC ....... G04B 19/02; G04B 19/24; G04B 19/262
See application file for complete search history.

(56) References Cited

U.S. PATENT DOCUMENTS 11,526,131 B2 * 12/2022 Bachmann ....... G04B 19/25353
11,733,653 B2 * 8/2023 Bachmann ........... G04B 19/223 368/37
2005/0078558 A1 * 4/2005 Dalloz ................. G04B 19/241 368/37
2016/0154378 A1 * 6/2016 Denden ................ G04B 19/235 368/220
2019/0286056 A1 * 9/2019 Reymond ............ G04B 19/268

FOREIGN PATENT DOCUMENTS

| | | | |
|---|---|---|---|
| CH | 706 192 | B1 | 9/2013 |
| CN | 114371608 | A | 4/2022 |
| EP | 3 540 522 | B1 | 10/2020 |
| JP | 01-129687 | U | 9/1989 |
| JP | 5-126964 | A | 5/1993 |
| JP | 2019-158883 | A | 9/2019 |
| RU | 2 696 672 | C1 | 8/2019 |

OTHER PUBLICATIONS

Communication issued Dec. 3, 2024, in corresponding Japanese Patent Application No. 2023-172117.
European Search Report for EP 22 20 7987 dated Mar. 31, 2023.
Communication dated Apr. 22, 2025 in Japanese Application No. 2023-172117.

* cited by examiner

*Primary Examiner* — Edwin A. Leon
*Assistant Examiner* — Jason M Collins
(74) *Attorney, Agent, or Firm* — Sughrue Mion, PLLC

(57) ABSTRACT

A mechanism for displaying the periods of an annual cycle (100) for a timepiece (200) capable of being driven by being dragged by a running train (10) of a horological movement (1), characterised in that the mechanism for displaying the periods of an annual cycle (100) includes: an indicator (110) indicating the periods of an annual cycle; an annual cycle train (120) capable of being driven by said running train (10) of the horological movement (1), and of rotating the indicator of the periods of an annual cycle (110); the mechanism for displaying the periods of an annual cycle (100) being characterised in that the annual cycle train (120) forms a gear train between the running train (10) and the indicator of the periods of an annual cycle (110) including at most four gearings.

18 Claims, 2 Drawing Sheets

MECHANISM FOR DISPLAYING PERIODS OF AN ANNUAL CYCLE OF A TIMEPIECE

CROSS REFERENCE TO RELATED APPLICATIONS

The present application is based on, and claims priority from the prior European Patent Application No. 22207987.3, filed on Nov. 17, 2022, the entire contents of which are incorporated herein by reference.

TECHNICAL FIELD OF THE INVENTION

The field of the invention relates to that of mechanisms for displaying the periods of an annual cycle, for example the seasons, of a timepiece.

The invention further relates to a horological movement including such a mechanism for displaying the periods of an annual cycle.

The invention further relates to a timepiece, for example a wristwatch, including a horological movement that includes such a mechanism for displaying the periods of an annual cycle.

TECHNOLOGICAL BACKGROUND

The mechanisms for displaying an annual cycle, and in particular the periods of this annual cycle, allow information relating to a given period during a solar annual cycle to be displayed.

The mechanisms for displaying the periods of an annual cycle are typically mechanisms with a jumping drive allowing an indicator facing a graduation or a division of a dial to correspond to these periods.

However, these jumping-type mechanisms for displaying the periods of an annual cycle are not very precise, as they do not inform the user whether he/she is at the beginning or end of the displayed period of the annual cycle.

For example, when such a mechanism for displaying the periods of an annual cycle allows the months to be indicated, or for example the seasons, the hand indicates the current period (month or season) without, however, giving more precise information on the remaining duration of the current period. As a result, driving these displays via jumps generates a “display error” as regards the actual state of the current period.

Moreover, these jumping display mechanisms consume power and generate power consumption peaks during the jump, which can momentarily disrupt the normal operation of the running train.

To overcome this drawback, mechanisms of the dragging type have been proposed for displaying the periods of an annual cycle, which mechanisms are driven continuously by the running train of the horological movement.

However, these dragging mechanisms are more complex to produce and more voluminous because they require a large number of gears between the running train and the indicator of the periods of an annual cycle.

Most known dragging-type mechanisms for displaying the periods of an annual cycle aim to produce a precise display of the annual cycle by getting as close as possible to the theoretical value of a tropical year, in particular by using a multitude of mechanisms and specific gear ratios to get as close as possible to the theoretical value of a tropical year.

Document RU 2767151 C1 can be cited as an example, and describes a mechanism for displaying a map of the sky including a first disc showing a map of the sky which is rotated by a gear train with six gearings set in motion by an hour wheel, the gear train having the following ratios:

$$i=36/28*42/12*50/12*51/12*55/12*50/25=2*365.234375$$

Document CH 679197 B5 can also be cited, which describes a zodiac indicator formed by a ring divided into twelve segments, each bearing the name of a month and/or of a sign of the zodiac. The ring makes one revolution per year of 365.244008 days and is rotated by a power take-off making one revolution per hour.

Although precise, these mechanisms for displaying the periods of an annual cycle suffer from several drawbacks.

Firstly, as described hereinabove, they are complex to produce and voluminous, which makes them difficult to integrate into horological movements.

Secondly, these display mechanisms, which are made up of a large number of parts, require one or more power sources to supply the required torques, in particular to prevent disruptions to the running of the running train.

As a result, complications for displaying the periods of an annual cycle are often limited to expensive, complex and voluminous timepieces.

There is thus a need to improve this type of dragging mechanism for displaying the periods of an annual cycle in order to address at least one of the aforementioned problems.

SUMMARY OF THE INVENTION

In this context, the invention proposes a sufficiently precise mechanism for displaying the periods of an annual cycle, which mechanism has a simplified design, is small in size, is easy to integrate into a horological movement and requires little power to operate.

To this end, the invention relates to a mechanism for displaying the periods of an annual cycle for a timepiece capable of being driven by being dragged by a running train of a horological movement, characterised in that the mechanism for displaying the periods of an annual cycle includes:

- an indicator indicating the periods of an annual cycle;
- an annual cycle train capable of being driven by said running train of the horological movement, and of rotating the indicator of the periods of an annual cycle;

the mechanism for displaying the periods of an annual cycle being characterised in that the annual cycle train forms a gear train between the running train and the indicator of the periods of an annual cycle including maximum four gearings.

Preferably, the gear train is configured to have a ratio of 1:365.234375, or a ratio that is a multiple of 1:365.234375, with only four gearings between the running train and the indicator of the periods of an annual cycle.

Thus, the gear train of the annual cycle gear is configured to have a ratio R of 1:365.234375 or a ratio R' which is a multiple of the ratio R 1:365.234375, so that $R'=n\times R$ with n an integer number.

According to the invention, the mechanism for displaying the periods of an annual cycle can be a mechanism for displaying the months, weeks, constellations, signs of the zodiac, an equation of time, a running equation of time, Christian festivities, equinoxes and solstices, climate seasons, the inclination of the earth relative to the sun, Chinese seasons or solar periods.

Preferably, the mechanism for displaying the periods of an annual cycle is a mechanism for displaying the solar periods.

Preferably, the mechanism for displaying the periods of an annual cycle is a mechanism for displaying the Chinese seasons.

Preferably, the mechanism for displaying the periods of an annual cycle is a celestial display mechanism.

Thanks to a particular choice of gear train for the annual cycle train, the applicant proposes a simplified mechanism for displaying the periods of an annual cycle, with in particular a gear train that is limited to four gearings at most, composed of at most three intermediate wheel sets between the running train and the annual cycle wheel carrying the indicator of the periods of an annual cycle, and sufficiently precise to allow for a correction of one day every 128 years.

Such a mechanism for displaying the periods of an annual cycle is easy to install in horological movements, offers improved reliability by reducing the number of moving parts, and consumes little power due to the various gear ratios of the wheel sets making up the gear train.

As a result, such a mechanism for displaying the periods of an annual cycle can be easily installed in a timepiece with a horological movement having an electrical power source and an electronic oscillator, for example a quartz oscillator.

In addition to the features mentioned in the preceding paragraph, the mechanism for displaying the periods of an annual cycle according to the invention can have one or more complementary features from among the following, considered either on an individual basis or according to any combination technically possible:

- the running train includes an hour wheel making one revolution in 12 hours, and the gear train of the annual cycle train is capable of being meshed with said hour wheel of the running train, the gear train of the annual cycle train being configured to have a ratio of 1:2*365.234375 between the hour wheel of the running train and the indicator of the periods of an annual cycle;
- the running train includes a 24-hour wheel making one revolution in 24 hours, and the gear train of the annual cycle train is capable of being meshed with said 24-hour wheel of the running train, the gear train of the annual cycle train being configured to have a ratio of 1:365.234375 between the 24-hour wheel of the running train and the indicator of the periods of an annual cycle;
- the annual cycle train includes a maximum of three wheel sets;
- the annual cycle train includes:
  - a first intermediate wheel set including a first intermediate wheel set wheel with 34 teeth and a first intermediate wheel set pinion with 8 teeth;
  - a second intermediate wheel set including a second intermediate wheel set wheel with 44 teeth and a second intermediate wheel set pinion with 8 teeth;
  - a third intermediate wheel set including a third intermediate wheel set wheel with 40 teeth and a third intermediate wheel set pinion with 8 teeth.
  - the display mechanism further includes a mechanism for frictionally setting the indicator of the periods of an annual cycle;
  - one of the wheels of the intermediate wheel sets is frictionally mounted relative to its pinion.

The invention further relates to a horological movement including a running train and a mechanism for displaying the periods of an annual cycle according to the invention, the annual cycle train being directly meshed with the running train.

Preferably, the running train includes an hour wheel making one revolution in twelve hours, the annual cycle train being directly meshed with the hour wheel, or the running train includes a 24-hour wheel making one revolution in twenty-four hours, the annual cycle train being directly meshed with the 24-hour wheel.

Preferably, the horological movement includes a running train including an hour wheel or a 24-hour wheel, the gear train of the annual cycle train of the mechanism for displaying the periods of an annual cycle being meshed with said hour wheel and having a ratio of 1:2*365.234375 or the gear train of the mechanism for displaying the periods of an annual cycle being meshed with said 24-hour wheel and having a ratio of 1:365.234375.

Preferably, the hour wheel has 8 teeth and the indicator of the periods of an annual cycle is rotated by an annual cycle wheel with 50 teeth; the gear train of the annual cycle train having the following ratios: 34/8*44/8*40/8*50/8.

Preferably, the 24-hour wheel has 8 teeth and the indicator of the periods of an annual cycle is rotated by an annual cycle wheel with 25 teeth; the gear train of the annual cycle train having the following ratios: 34/8*44/8*40/8*25/8.

The invention further relates to a timepiece including a mechanism for displaying the periods of an annual cycle according to the invention, or including a horological movement according to the invention.

Advantageously, the timepiece is a wristwatch.

BRIEF DESCRIPTION OF THE FIGURES

The purposes, advantages and features of the present invention will be better understood upon reading the detailed description given below with reference to the following figures.

In all figures, common elements bear the same reference numerals unless indicated otherwise.

DETAILED DESCRIPTION OF THE INVENTION

The present invention was drawn from the general idea consisting of simplifying the mechanisms for displaying the periods of an annual cycle so that they can be more easily installed in any type of mechanical, electromechanical or electronic horological movement.

Figure 1:
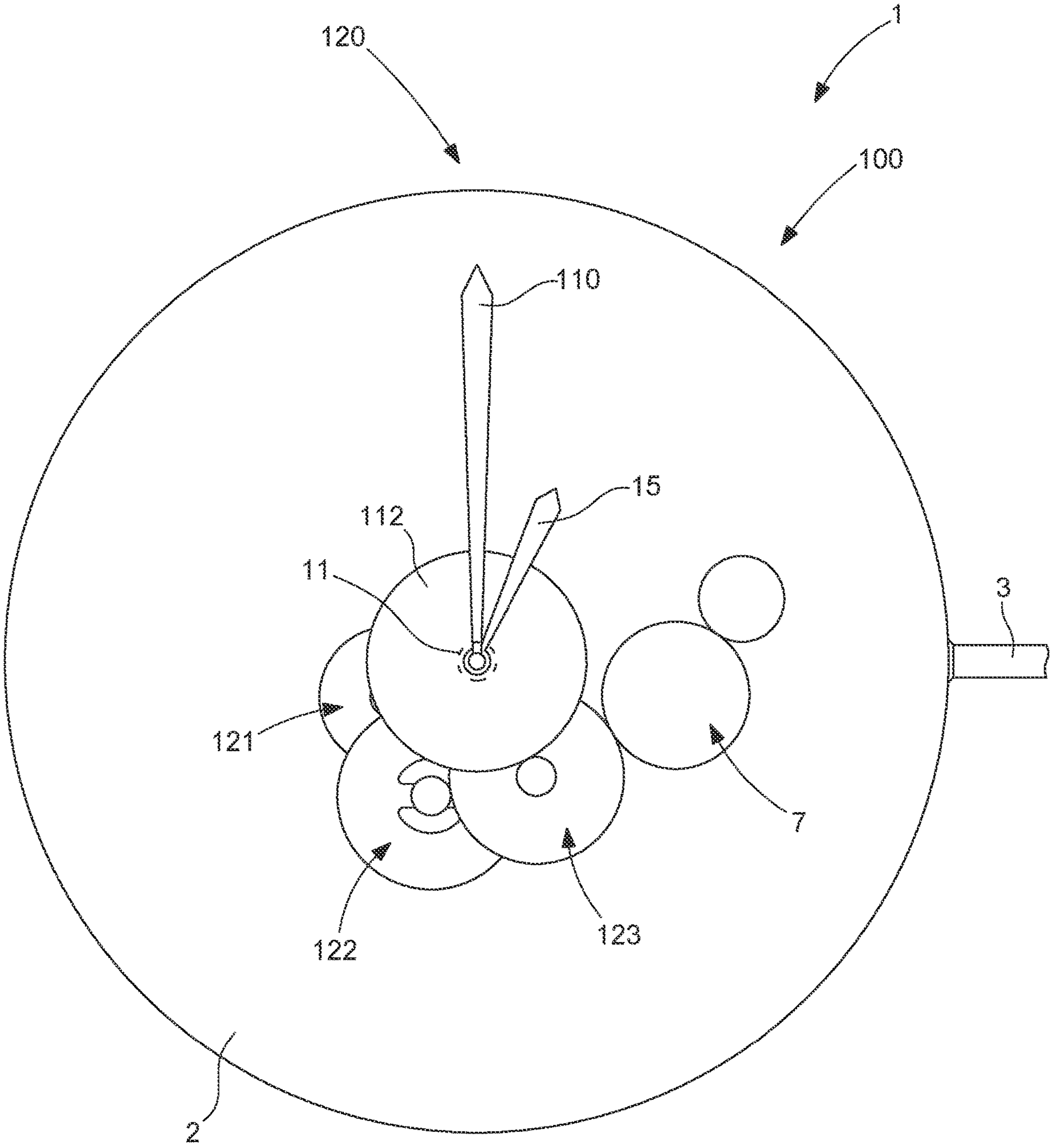
FIG. 1 diagrammatically shows a top view of an example embodiment of a mechanism for displaying the periods of an annual cycle according to the invention.

FIG. 1 diagrammatically illustrates an example embodiment of a mechanism for displaying the periods of an annual cycle 100 according to the invention, mounted in a plate 2 of a horological movement 1.

Figure 3:
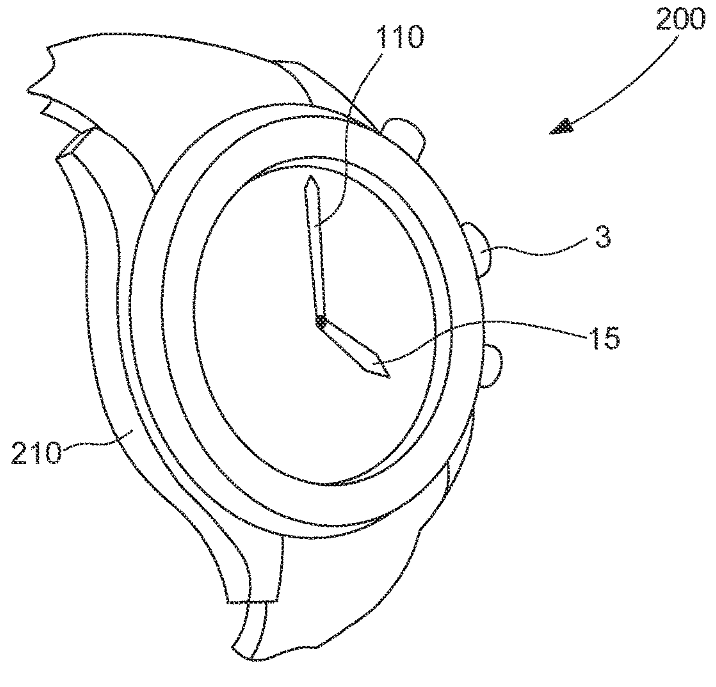
FIG. 3 diagrammatically shows an example of a timepiece including a mechanism for displaying the periods of an annual cycle according to the invention.

The mechanism for displaying the periods of an annual cycle 100 according to the invention is intended to be housed in a timepiece 200, for example in a case 210 of a wristwatch diagrammatically shown in FIG. 3.

Figure 2:
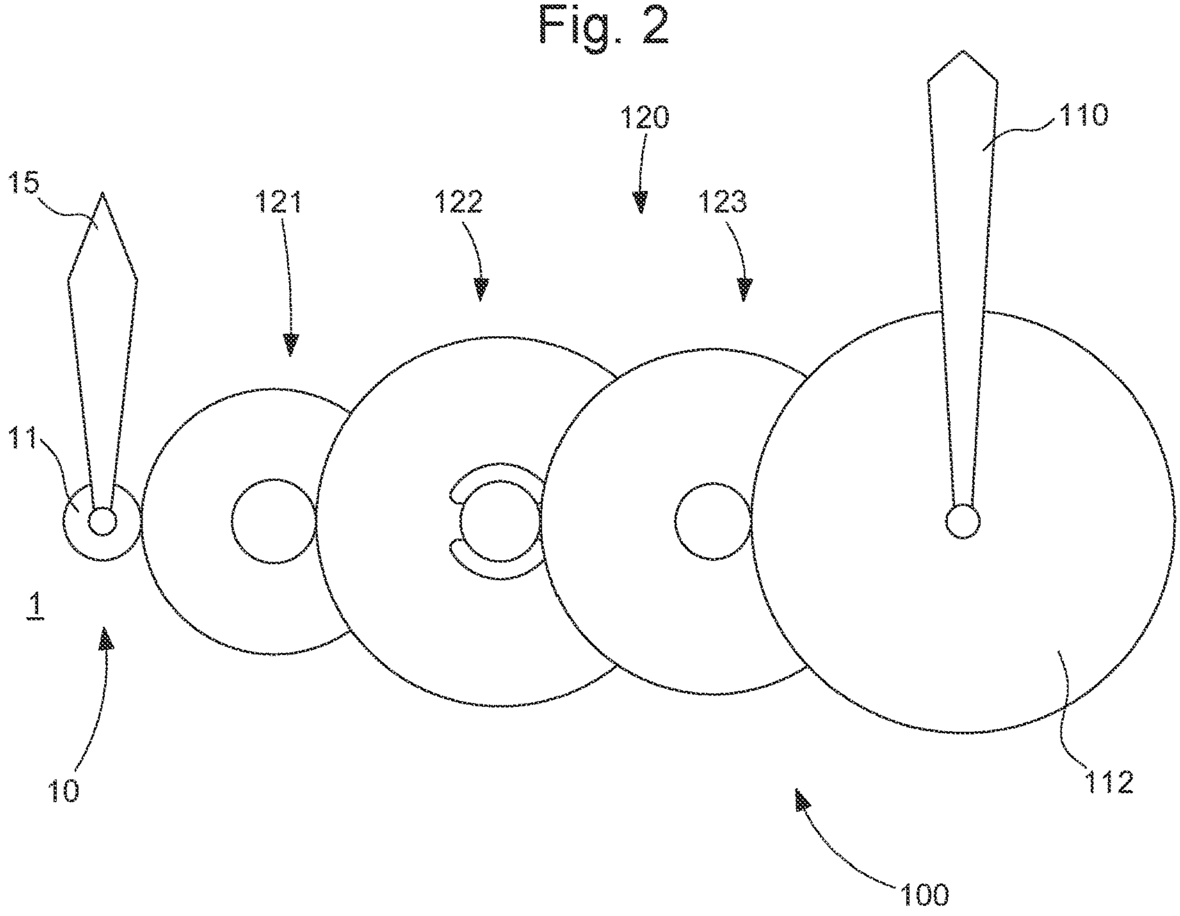
FIG. 2 shows an operating diagram more particularly illustrating the annual cycle train of the mechanism for displaying the periods of an annual cycle illustrated in FIG. 1.

The mechanism for displaying the periods of an annual cycle 100 according to the invention is driven by the horological movement 1, shown in part in FIGS. 1 to 2.

Conventionally, the horological movement 1 comprises a running train 10 having in particular a motion-work (not shown) driving an hour wheel 11, the running train 10 assembly being configured so that the hour wheel 11 makes one complete revolution in 12 hours.

The hour wheel 11 conventionally carries an hour indicator 15, for example an hour hand.

The mechanism for displaying the periods of an annual cycle 100 includes an indicator 110 indicating the periods of an annual cycle.

The indicator of the periods of an annual cycle 110 is rotated by an annual cycle wheel 112. Preferably, the indicator of the periods of an annual cycle 110 is rigidly connected to the annual cycle wheel 112.

The indicator of the periods of an annual cycle 110 is, for example, a hand rigidly connected to the shaft of the annual cycle wheel 112.

According to an alternative embodiment, the indicator of the periods of an annual cycle 110 can also be a disc rigidly connected to the annual cycle wheel 112.

Depending on the type of display desired, the disc can be visible in its entirety to the user, or in part through a suitably shaped opening made in a dial of the timepiece 200.

The indicator of the periods of an annual cycle 110 is kinematically connected to the running train 10 via an annual cycle train 120.

More specifically, the annual cycle train 120 is directly meshed with the hour wheel 11 carrying the hour hand 15 on the one hand, and with the annual cycle wheel 112 carrying the indicator of the periods of an annual cycle 110 on the other hand.

The indicator of the periods of an annual cycle 110 is thus set in motion in a dragging manner by the running train 10.

The annual cycle train 120 forms a gear train with a ratio R of 1:365.234375 or a ratio R' which is a multiple of the ratio R of 1:365.234375 between the running train 10 and the indicator of the periods of an annual cycle 110.

More particularly, the annual cycle train 120 forms a gear train with a ratio of 1:2*365.234375 between the hour wheel 11 (making one revolution in 12 hours) and the annual cycle wheel 112.

The annual cycle train 120 is formed by a maximum of three intermediate wheel sets 121, 122, 123 positioned between the hour wheel 11 and the annual cycle wheel 112, thus constituting four gearings from the hour wheel 11 to the annual cycle wheel 112. The annual cycle train 120 according to the invention has a reduced number of wheel sets, which allows the overall dimensions of such a mechanism for displaying the periods of an annual cycle to be reduced.

Preferably, the annual cycle train 120 forms a gear train with the prime numbers 17, 11, 5 in the numerator and 2 in the denominator.

The annual cycle train 120 includes a first intermediate wheel set 121 directly meshed with the hour wheel 11, a second intermediate wheel set 121 positioned between the first intermediate wheel set 121 and a third intermediate wheel set 123 and directly meshed with the annual cycle wheel 112.

In the example embodiment illustrated in FIGS. 1 and 2:

the hour wheel 11 has 8 teeth;

the first intermediate wheel set 121 includes a first intermediate wheel set wheel with 34 teeth and a first intermediate wheel set pinion with 8 teeth;

the second intermediate wheel set 122 includes a second intermediate wheel set wheel with 44 teeth and a second intermediate wheel set pinion with 8 teeth;

the third intermediate wheel set 123 includes a third intermediate wheel set wheel with 40 teeth and a third intermediate wheel set pinion with 8 teeth;

the annual cycle wheel 112 has 50 teeth.

As a result, between the hour wheel 11 and the annual cycle wheel 112, the annual cycle train 120 forms a gear train with the following ratio:

$$i=34/8*44/8*40/8*50/8=2*365.234375$$

Other gearing combinations are possible by equivalence provided that the gear train has a ratio R of 1:365.234375 or a ratio R' which is a multiple of the ratio R 1:365.234375, so that R'=n×R with n an integer number, between the running train 10 and the indicator of the periods of an annual cycle 110, and that the gear train is limited to four gearings between the hour wheel 11 and the annual cycle wheel 112.

The mechanism for displaying the periods of an annual cycle 100 includes a setting mechanism which can be independent or common to the mechanism for setting the running train 10.

Preferably, the indicator of the periods of an annual cycle 110 is set by means of a control stem 3 used to set the hands 15 of the running train 10 comprised in the horological movement 1.

In the case of a mechanical horological movement, the control stem 3 is combined with the winding stem, which winds the mainspring and sets the hands of the running train.

The control stem 3 can adopt various axial positions relative to the case 210 and perform various control and/or setting functions.

One of the positions of the control stem 3 allows the indicator of the periods of an annual cycle 110 to be set by friction via a setting train 7 driven by the rotation of the control stem 3, in cooperation with a sliding pinion of the control stem 3.

Preferably, one of the wheels of the intermediate wheel sets 121, 122, 123 of the annual cycle train 120, or the annual cycle wheel 112, is frictionally mounted on its shaft, such that it is possible to de-index the annual cycle wheel 112 from the running train 10, and thus modify the angular position of the indicator of the periods of an annual cycle 110 without modifying the angular position of the hands 15 of the running train 10. As the principle of friction is well known, there is no need to describe it further.

Preferably, the setting train 7 acts on one of the intermediate wheel sets 121, 122, 123 of the annual cycle train 120 so as to improve precision during the setting operation.

Preferably, the setting train 7 acts on the third intermediate wheel set 123, i.e. the intermediate wheel set of the annual cycle train 120 directly meshed with the annual cycle wheel 112.

Preferably, the wheel of the second intermediate wheel set 122 is frictionally mounted relative to its pinion.

The setting train 7 is thus located between the sliding pinion (not shown) of the control stem 3 and the pinion of the third intermediate wheel set 123.

The invention has been described in particular with the annual cycle train 120 meshed directly on the hour wheel making one complete revolution in twelve hours; however, it goes without saying that the invention is applicable when the annual cycle train 120 is meshed with another wheel of the running train whose complete rotation is a multiple of the rotation of the hour wheel, such as a 24-hour wheel. The mechanism for displaying the periods of an annual cycle as described hereinabove must thus be adapted to take account of the ratio of 2.

By way of example, the annual cycle wheel 112 can have 25 teeth instead of 50 teeth if the annual cycle train 120 is meshed with a 24-hour wheel, while maintaining the same ratios as those presented hereinabove. This gives a ratio of 1:365.234375 between a 24-hour wheel and the indicator of the periods of an annual cycle 110.

According to another example embodiment, the annual cycle wheel 112 is a wheel with 50 teeth meshed with a 24-hour wheel with 10 teeth instead of 20 teeth as described hereinabove. The ratios are thus maintained.

Such a mechanism for displaying the periods of an annual cycle is perfectly suited to mechanical horological movements with or without a date display, and to electronic or electromechanical horological movements, because the mechanism for displaying the periods of an annual cycle is of the dragging type and does not generate power consumption peaks on the running train 10.

The invention further relates to a horological movement 1 including a mechanism for displaying the periods of an annual cycle 100 according to the invention.

The mechanism for displaying the periods of an annual cycle according to the invention can further include ad hoc means for producing a retrograde display for displaying the periods of an annual cycle. Such means are conventionally used to move the indicator of the periods of an annual cycle in an arc of a circle (for example facing a graduation on a dial) and to return it to its starting position when it has travelled the entire annual cycle.

The invention further relates to a timepiece 200, such as a wristwatch, including a horological movement 1 according to the invention, housed inside a watch case 210.

The invention claimed is:

1. A mechanism for displaying the periods of an annual cycle for a timepiece driven by a running train of a horological movement, wherein the mechanism for displaying the periods of an annual cycle comprises:

an indicator indicating the periods of an annual cycle; and an annual cycle train configured to be driven by said running train of the horological movement, and to rotate the indicator of the periods of an annual cycle;

wherein the annual cycle train forms a gear train between the running train and the indicator of the periods of an annual cycle including at most four gearings, and wherein the annual cycle train forms a gear train configured to have a ratio of 1:365.234375 or a ratio that is a multiple of 1:365.234375 between the running train and the indicator of the periods of an annual cycle.

2. The mechanism for displaying the periods of an annual cycle for a timepiece according to claim 1, wherein the running train includes an hour wheel making one revolution in 12 hours, and in that the gear train of the annual cycle train is capable of being meshed with said hour wheel of the running train, the gear train of the annual cycle train being configured to have a ratio of 1:2*365.234375 between the hour wheel of the running train and the indicator of the periods of an annual cycle.

3. The mechanism for displaying the periods of an annual cycle for a timepiece according to claim 1, wherein the running train includes a 24-hour wheel making one revolution in 24 hours, and in that the gear train of the annual cycle train is capable of being meshed with said 24-hour wheel of the running train, the gear train of the annual cycle train being configured to have a ratio of 1:365.234375 between the 24-hour wheel of the running train and the indicator of the periods of an annual cycle.

4. The mechanism for displaying the periods of an annual cycle for a timepiece according to claim 1, wherein the ratio of the gear train of the annual cycle train has the prime number 17, 11 or 5 in the numerator and 2 in the denominator.

5. The mechanism for displaying the periods of an annual cycle for a timepiece according to claim 1, wherein the annual cycle train includes:

a first intermediate wheel set including a first intermediate wheel set wheel with 34 teeth and a first intermediate wheel set pinion with 8 teeth;

a second intermediate wheel set including a second intermediate wheel set wheel with 44 teeth and a second intermediate wheel set pinion with 8 teeth;

a third intermediate wheel set including a third intermediate wheel set wheel with 40 teeth and a third intermediate wheel set pinion with 8 teeth.

6. The mechanism for displaying the periods of an annual cycle for a timepiece according to claim 5, wherein one of the wheels of the intermediate wheel sets is frictionally mounted relative to its pinion.

7. The mechanism for displaying the periods of an annual cycle for a timepiece according to claim 1, wherein it includes a mechanism for frictionally setting the indicator of the periods of an annual cycle.

8. The mechanism for displaying the periods of an annual cycle for a timepiece according to claim 1, wherein the mechanism is a mechanism for displaying the Chinese seasons.

9. A horological movement including a running train and the mechanism for displaying the periods of an annual cycle (100) according to claim 1, wherein the annual cycle train being directly meshed with the running train.

10. The horological movement according to claim 9, wherein the running train includes an hour wheel carrying out one revolution in twelve hours, the annual cycle train being directly meshed with the hour wheel.

11. The horological movement according to claim 10, wherein the hour wheel has 8 teeth and in that the indicator of the periods of an annual cycle is rotated by an annual cycle wheel with 50 teeth; the gear train of the annual cycle train having the following ratios: 34/8*44/8*40/8*50/8.

12. The horological movement according to claim 9, wherein the running train includes a 24-hour wheel carrying out one revolution in twenty-four hours, the annual cycle train being directly meshed with the 24-hour wheel.

13. The horological movement according to claim 12, wherein the 24-hour wheel has 8 teeth and in that the annual cycle wheel has 25 teeth; the gear train of the annual cycle train having the following ratios: 34/8*44/8*40/8*25/8.

14. A timepiece including the horological movement according to claim 9.

15. A timepiece including the mechanism for displaying the periods of an annual cycle according to claim 1.

16. The timepiece according to claim 15, wherein said timepiece is a wristwatch.

17. A mechanism for displaying the periods of an annual cycle for a timepiece driven by a running train of a horological movement, wherein the mechanism for displaying the periods of an annual cycle comprises:

an indicator indicating the periods of an annual cycle; and an annual cycle train configured to be driven by said running train of the horological movement, and to rotate the indicator of the periods of an annual cycle;

wherein the annual cycle train forms a gear train between the running train and the indicator of the periods of an annual cycle including at most four gearings, and wherein the ratio of the gear train of the annual cycle train has the prime number 17, 11 or 5 in the numerator and 2 in the denominator.

18. A mechanism for displaying the periods of an annual cycle for a timepiece driven by a running train of a horological movement, wherein the mechanism for displaying the periods of an annual cycle comprise:

an indicator indicating the periods of an annual cycle; and an annual cycle train configured to be driven by said running train of the horological movement, and to rotate the indicator of the periods of an annual cycle;

wherein the annual cycle train forms a gear train between the running train and the indicator of the periods of an annual cycle including at most four gearings, and wherein the annual cycle train includes:

a first intermediate wheel set including a first intermediate wheel set wheel with 34 teeth and a first intermediate wheel set pinion with 8 teeth;

a second intermediate wheel set including a second intermediate wheel set wheel with 44 teeth and a second intermediate wheel set pinion with 8 teeth; and a third intermediate wheel set including a third intermediate wheel set wheel with 40 teeth and a third intermediate wheel set pinion with 8 teeth.

* * * * *